United States Patent
Ryshtun et al.

(10) Patent No.: US 8,610,443 B1
(45) Date of Patent: Dec. 17, 2013

(54) ATTENUATOR CIRCUIT OF A CAPACITANCE-SENSING CIRCUIT

(71) Applicants: Andriy Ryshtun, Lviv (UA); Viktor Kremin, Lviv (UA); Mykhaylo Krekhovetskyy, Lviv (UA); Ruslan Omelchuk, Lviv (UA)

(72) Inventors: Andriy Ryshtun, Lviv (UA); Viktor Kremin, Lviv (UA); Mykhaylo Krekhovetskyy, Lviv (UA); Ruslan Omelchuk, Lviv (UA)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 13/895,115

(22) Filed: May 15, 2013

Related U.S. Application Data

(60) Provisional application No. 61/777,462, filed on Mar. 12, 2013.

(51) Int. Cl.
    *G01R 27/26* (2006.01)
(52) U.S. Cl.
    USPC .......................... 324/683; 324/658
(58) Field of Classification Search
    USPC .............. 324/658, 683, 684; 341/33
    See application file for complete search history.

(56) References Cited

U.S. PATENT DOCUMENTS

| | | |
|---|---|---|
| 3,708,603 A | 1/1973 | Keagle et al. |
| 2012/0001866 A1 | 1/2012 | Rapakko |
| 2012/0306803 A1 | 12/2012 | Kuo |
| 2013/0049525 A1 | 2/2013 | Petkov et al. |
| 2013/0063395 A1 | 3/2013 | Byun et al. |
| 2013/0076646 A1 | 3/2013 | Krah et al. |

FOREIGN PATENT DOCUMENTS

| | | |
|---|---|---|
| WO | 2010075308 A2 | 7/2010 |
| WO | 2010111668 A1 | 9/2010 |

OTHER PUBLICATIONS

Analog Devices Inc., AD7877 Input Touch Screen Controller Linux Driver. <wiki.analog.com/resources/tools-software/linux-drivers/input-touchscreen/ad7877> © 1995-2013. 7 pages.

Patentability Search for "Attenuator Circuit of a Capacitance-Sensing Circuit" dated May 2013, 12 pages.

*Primary Examiner* — Vincent Q Nguyen

(57) ABSTRACT

Apparatuses and methods of input attenuator circuits are described. One sensing circuit includes an attenuator circuit to receive a signal from an electrode of a sense array. The attenuator circuit is configured to attenuate input current of the signal. The attenuator circuit includes an attenuation matrix including an input terminal to receive the signal and multiple resistors. The attenuation matrix is configured to split the input current into an output current of the attenuation signal on a first output terminal and a second output current on a second output terminal. The attenuation matrix is to output the attenuated signal on the first output terminal to an integrator of the sensing circuit. The attenuator circuit also includes a buffer coupled between the attenuation matrix and the integrator. The buffer is configured to maintain a substantially same voltage at the first output terminal and the second output terminal.

15 Claims, 13 Drawing Sheets

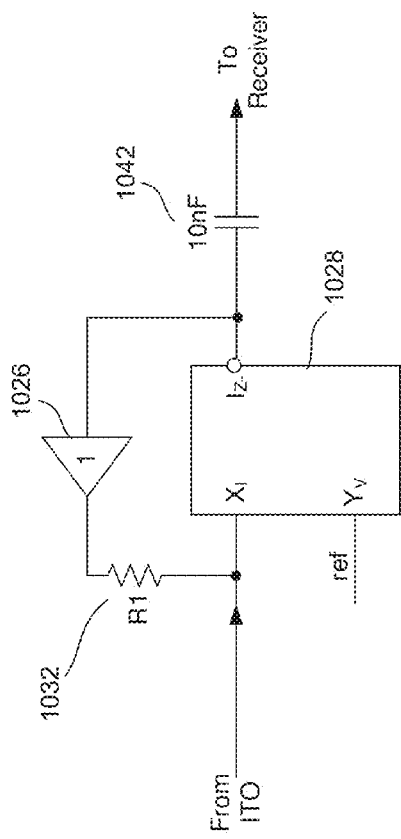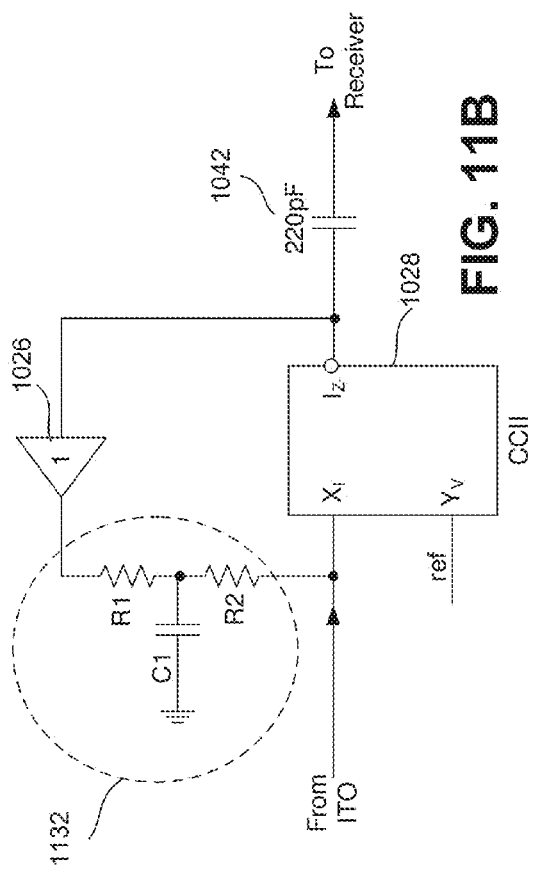
FIG. 11A
FIG. 11B

_US 8,610,443 B1_

ATTENUATOR CIRCUIT OF A CAPACITANCE-SENSING CIRCUIT

RELATED APPLICATIONS

This application claims the benefit of U.S. Provisional Application No. 61/777,462, filed Mar. 12, 2013, the entire contents of which are incorporated by reference herein.

TECHNICAL FIELD

The present disclosure relates generally to sensing systems, and more particularly to capacitance-sensing systems configurable to determine touch locations of touches on the capacitive-sensing systems.

BACKGROUND

Capacitance sensing systems can sense electrical signals generated on electrodes that reflect changes in capacitance. Such changes in capacitance can indicate a touch event (i.e., the proximity of an object to particular electrodes). Capacitive sense elements may be used to replace mechanical buttons, knobs and other similar mechanical user interface controls. The use of a capacitive sense element allows for the elimination of complicated mechanical switches and buttons, providing reliable operation under harsh conditions. In addition, capacitive sense elements are widely used in modern customer applications, providing new user interface options in existing products. Capacitive sense elements can range from a single button to a large number arranged in the form of a capacitive sense array for a touch-sensing surface.

Transparent touch screens that utilize capacitive sense arrays are ubiquitous in today's industrial and consumer markets. They can be found on cellular phones, GPS devices, set-top boxes, cameras, computer screens, MP3 players, digital tablets, and the like. The capacitive sense arrays work by measuring the capacitance of a capacitive sense element, and looking for a delta in capacitance indicating a touch or presence of a conductive object. When a conductive object (e.g., a finger, hand, or other object) comes into contact or close proximity with a capacitive sense element, the capacitance changes and the conductive object is detected. The capacitance changes of the capacitive touch sense elements can be measured by an electrical circuit. The electrical circuit converts the measured capacitances of the capacitive sense elements into digital values.

There are two typical types of capacitance: 1) mutual capacitance where the capacitance-sensing circuit has access to both electrodes of the capacitor; 2) self capacitance where the capacitance-sensing circuit has only access to one electrode of the capacitor where the second electrode is tied to a DC voltage level or is parasitically coupled to Earth Ground. A touch panel has a distributed load of capacitance of both types (1) and (2) and Cypress' touch solutions sense both capacitances either uniquely or in hybrid form with its various sense modes.

BRIEF DESCRIPTION OF THE DRAWINGS

The present invention is illustrated by way of example, and not of limitation, in the figures of the accompanying drawings.

FIG. 11A is a circuit diagram illustrating a feedback of the current conveyor of FIG. 9 according to one embodiment.

FIG. 11B is a circuit diagram illustrating a modified feedback of the current conveyor of FIG. 9 according to another embodiment.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Touchscreen controllers should be protected from external noise sources. The noise sources can have high amplitude and can saturate the touchscreen controller. The saturation blocks the touchscreen controller operation. The embodiments described herein can be used to prevent saturation of the touchscreen controller, keeping the touchscreen controller operating even under high amplitude noise conditions. The input attenuators of the embodiments described herein can be used with receivers or charged-balanced receivers with active integrators, as describe herein. The input attenuator circuit at the input of an active integrator of a capacitance-sensing circuit keeps the converter in a linear operation range. The input attenuator circuit attenuates currents from a touch panel, such as an indium-tin-oxide (ITO) panel, allowing the touchscreen controller to measure mutual capacitance, self capacitance, or both of the ITO panel. The input attenuator circuit can provide zero differential voltage across a resistive divider of the input attenuator circuit.

Figure 1:
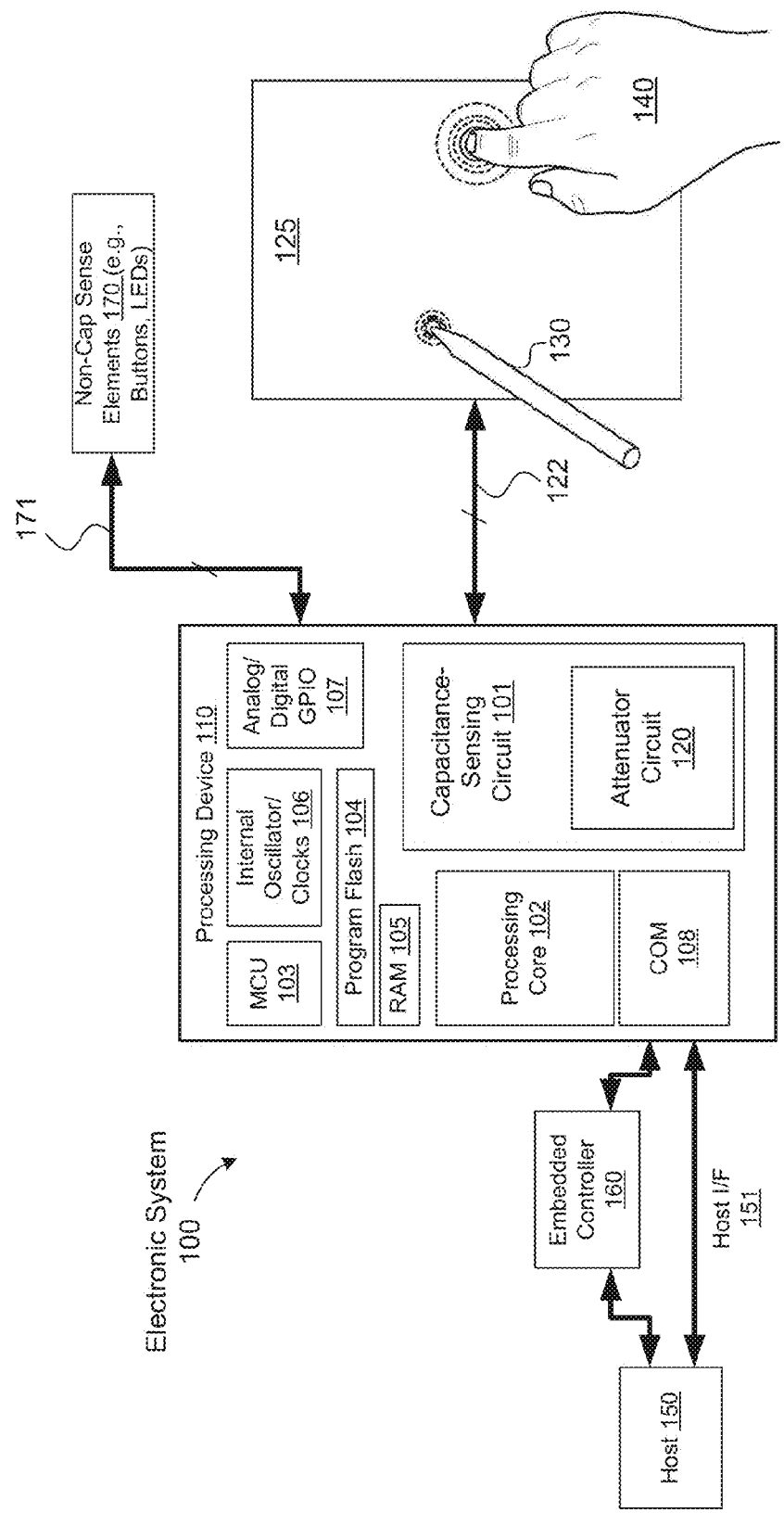
FIG. 1 is a block diagram illustrating one embodiment of an electronic system having a processing device, including an attenuator circuit.

FIG. 1 is a block diagram illustrating one embodiment of an electronic system 100 having a processing device 110, including an attenuator circuit 120. Details regarding the attenuator circuit 120 are described in more detail with respect to FIGS. 2-11. The processing device 110 is configured to detect one or more touches on a touch-sensing device, such as the capacitive sense array 125. The processing device can detect conductive objects, such as touch objects 140 (fingers or passive styluses, an active stylus 130, or any combination thereof. The capacitance-sensing circuit 101 can measure touch data on the capacitive sense array 125. The touch data may be represented as multiple cells, each cell representing an intersection of sense elements (e.g., electrodes) of the capacitive sense array 125. In another embodiment, the touch data is a 2D capacitive image of the capacitive sense array 125. In one embodiment, when the capacitance-sensing circuit 101 measures mutual capacitance of the touch-sensing device (e.g., capacitive sense array 125), the capacitance-sensing circuit 101 obtains a 2D capacitive image of the touch-sensing device and processes the data for peaks and positional information. In another embodiment, the processing device 110 is a microcontroller that obtains a capacitance touch signal data set, such as from a sense array, and finger detection firmware executing on the microcontroller identifies data set areas that indicate touches, detects and processes peaks, calculates the coordinates, or any combination therefore. The firmware identifies the peaks using the embodiments described herein. The firmware can calculate a precise coordinate for the resulting peaks. In one embodiment, the firmware can calculate the precise coordinates for the resulting peaks using a centroid algorithm, which calculates a centroid of the touch, the centroid being a center of mass of the touch. The centroid may be an X/Y coordinate of the touch. Alternatively, other coordinate interpolation algorithms may be used to determine the coordinates of the resulting peaks. The microcontroller can report the precise coordinates to a host processor, as well as other information.

Electronic system 100 includes processing device 110, capacitive sense array 125, stylus 130, host processor 150, embedded controller 160, and non-capacitive sense elements 170. The capacitive sense elements are electrodes of conductive material, such as copper. The sense elements may also be part of an ITO panel. The capacitive sense elements can be configurable to allow the capacitive-sensing circuit 101 to measure self capacitance, mutual capacitance, or any combination thereof. In the depicted embodiment, the electronic system 100 includes the capacitive sense array 125 coupled to the processing device 110 via bus 122. The capacitive sense array 125 may include a multi-dimension capacitive sense array. The multi-dimension sense array includes multiple sense elements, organized as rows and columns. In another embodiment, the capacitive sense array 125 operates as an all-points-addressable ("APA") mutual capacitive sense array. In another embodiment, the capacitive sense array 125 operates as a coupled-charge receiver. In another embodiment, the capacitive sense array 125 is non-transparent capacitive sense array (e.g., PC touchpad). The capacitive sense array 125 may be disposed to have a flat surface profile. Alternatively, the capacitive sense array 125 may have non-flat surface profiles. Alternatively, other configurations of capacitive sense arrays may be used. For example, instead of vertical columns and horizontal rows, the capacitive sense array 125 may have a hexagon arrangement, or the like, as would be appreciated by one of ordinary skill in the art having the benefit of this disclosure. In one embodiment, the capacitive sense array 125 may be included in an ITO panel or a touch screen panel.

The operations and configurations of the processing device 110 and the capacitive sense array 125 for detecting and tracking the touch object 140 and stylus 130 are described herein. In short, the processing device 110 is configurable to detect a presence of the touch object 140, a presence of a stylus 130 on the capacitive sense array 125, or any combination thereof. The processing device 110 may detect and track the stylus 130 and the touch object 140 individually on the capacitive sense array 125. In one embodiment, the processing device 110 can detect and track both the stylus 130 and touch object 140 concurrently on the capacitive sense array 125. If the touching object is an active stylus, in one embodiment, the active stylus 130 is configurable to operate as the timing "master," and the processing device 110 adjusts the timing of the capacitive sense array 125 to match that of the active stylus 130 when the active stylus 130 is in use. In one embodiment, the capacitive sense array 125 capacitively couples with the active stylus 130, as opposed to conventional inductive stylus applications. It should also be noted that the same assembly used for the capacitive sense array 125, which is configurable to detect touch objects 140, is also used to detect and track a stylus 130 without an additional PCB layer for inductively tracking the active stylus 130.

In the depicted embodiment, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). The digital block array may be configurable to implement a variety of digital logic circuits (e.g., DACs, digital filters, or digital control systems) using, in one embodiment, configurable user modules ("UMs"). The digital block array may be coupled to a system bus. Processing device 110 may also include memory, such as random access memory ("RAM") 105 and program flash 104. RAM 105 may be static RAM ("SRAM"), and program flash 104 may be a non-volatile storage, which may be used to store firmware (e.g., control algorithms executable by processing core 102 to implement operations described herein). Processing device 110 may also include a memory controller unit ("MCU") 103 coupled to memory and the processing core 102. The processing core 102 is a processing element configured to execute instructions or perform operations. The processing device 110 may include other processing elements as would be appreciated by one of ordinary skill in the art having the benefit of this disclosure. It should also be noted that the memory may be internal to the processing device or external to it. In the case of the memory being internal, the memory may be coupled to a processing element, such as the processing core 102. In the case of the memory being external to the processing device, the processing device is coupled to the other device in which the memory resides as would be appreciated by one of ordinary skill in the art having the benefit of this disclosure.

The processing device 110 may also include an analog block array (not shown). The analog block array is also coupled to the system bus. Analog block array may also be configurable to implement a variety of analog circuits (e.g., ADCs or analog filters) using, in one embodiment, configurable UMs. The analog block array may also be coupled to the GPIO 107.

As illustrated, capacitance-sensing circuit 101 may be integrated into processing device 110. Capacitance-sensing circuit 101 may include analog I/O for coupling to an external component, such as touch-sensor pad (not shown), capacitive sense array 125, touch-sensor slider (not shown), touch-sensor buttons (not shown), and/or other devices. The capacitance-sensing circuit 101 may be configurable to measure capacitance using mutual-capacitance sensing techniques, self-capacitance sensing technique, charge coupling techniques or the like. In one embodiment, capacitance-sensing circuit 101 operates using a charge accumulation circuit, a capacitance modulation circuit, or other capacitance sensing methods known by those skilled in the art. In an embodiment, the capacitance-sensing circuit 101 is of the Cypress TMA-3xx, TMA-4xx, or TMA-xx families of touch screen controllers. Alternatively, other capacitance-sensing circuits may be used. The mutual capacitive sense arrays, or touch screens, as described herein, may include a transparent, conductive sense array disposed on, in, or under either a visual display itself (e.g. LCD monitor), or a transparent substrate in front of the display. In an embodiment, the TX and RX electrodes are configured in rows and columns, respectively. It should be noted that the rows and columns of electrodes can be configured as TX or RX electrodes by the capacitance-sensing circuit 101 in any chosen combination. In one embodiment, the TX and RX electrodes of the sense array 125 are configurable to operate as a TX and RX electrodes of a mutual capacitive sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive sense array, instead of measuring a mutual capacitance at an intersection of a RX electrode and a TX electrode (a sense element) as done during mutual-capacitance sensing. An intersection between two sense elements may be understood as a location at which one sense electrode crosses over or overlaps another, while maintaining galvanic isolation from each other. The capacitance-sensing circuit 101 does not use mutual-capacitance or self-capacitance sensing to measure capacitances of the sense elements when performing a stylus sensing. Rather, the capacitance-sensing circuit 101 measures a charge that is capacitively coupled between the sense array 125 and the stylus as described herein. The capacitance associated with the intersection between a TX electrode and an RX electrode can be sensed by selecting every available combination of TX electrode and RX electrode. When a touch object, such as a finger or stylus, approaches the capacitive sense array 125, the object causes a decrease in mutual capacitance between some of the TX/RX electrodes. In another embodiment, the presence of a finger increases the coupling capacitance of the electrodes. Thus, the location of the finger on the capacitive sense array 125 can be determined by identifying the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more inputs can be determined. It should be noted that the process can calibrate the sense elements (intersections of RX and TX electrodes) by determining baselines for the sense elements.

It should also be noted that interpolation may be used to detect finger position at better resolutions than the row/column pitch as would be appreciated by one of ordinary skill in the art having the benefit of this disclosure. In addition, various types of coordinate interpolation algorithms may be used to detect the center of the touch as would be appreciated by one of ordinary skill in the art having the benefit of this disclosure.

The capacitance-sensing circuit 101 includes the attenuator circuit 120. Additional details of the attenuator circuit 120 are described below with respect to FIGS. 2-11.

In an embodiment, the electronic system 100 may also include non-capacitive sense elements 170 coupled to the processing device 110 via bus 171 and GPIO port 107. The non-capacitive sense elements 170 may include buttons, light emitting diodes ("LEDs"), and other user interface devices, such as a mouse, a keyboard, or other functional keys that do not use capacitance sensing. In one embodiment, buses 122, and 171 are embodied in a single bus. Alternatively, these buses may be configured into any combination of one or more separate buses.

Processing device 110 may include internal oscillator/clocks 106 and communication block ("COM") 108. In another embodiment, the processing device 110 includes a spread spectrum clock (not shown). The oscillator/clocks block 106 provides clock signals to one or more of the components of processing device 110. Communication block 108 may be used to communicate with an external component, such as a host processor 150, via host interface ("I/F") line 151. Alternatively, processing device 110 may also be coupled to embedded controller 160 to communicate with the external components, such as host processor 150. In one embodiment, the processing device 110 is configurable to communicate with the embedded controller 160 or the host processor 150 to send and/or receive data.

Processing device 110 may reside on a common carrier substrate such as, for example, an integrated circuit ("IC") die substrate, a multi-chip module substrate, or the like. Alternatively, the components of processing device 110 may be one or more separate integrated circuits and/or discrete components. In one exemplary embodiment, processing device 110 is the Programmable System on a Chip (PSoC®) processing device, developed by Cypress Semiconductor Corporation, San Jose, Calif. Alternatively, processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 110 may also be done in the host.

Capacitance-sensing circuit 101 may be integrated into the IC of the processing device 110, or alternatively, in a separate IC. Alternatively, descriptions of capacitance-sensing circuit 101 may be generated and compiled for incorporation into other integrated circuits. For example, behavioral level code describing the capacitance-sensing circuit 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance-sensing circuit 101.

It should be noted that the components of electronic system 100 may include all the components described above. Alternatively, electronic system 100 may include some of the components described above.

In one embodiment, the electronic system 100 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition, and numeric keypad operation.

Figure 2A:
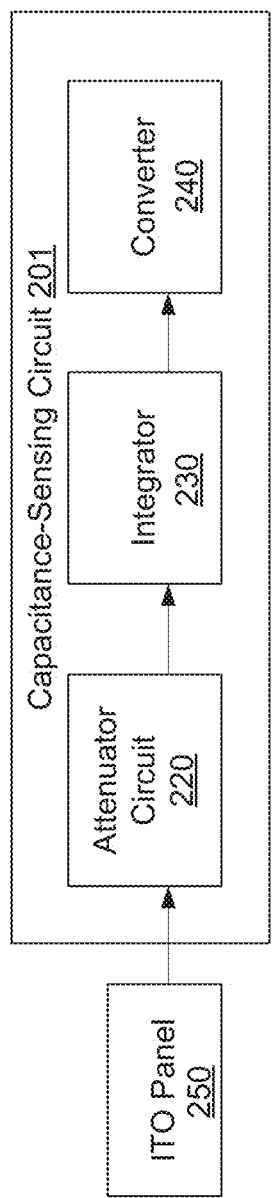
FIG. 2A is a block diagram of a capacitance-sensing circuit including an attenuator circuit according to one embodiment.

FIG. 2A is a block diagram of a capacitance-sensing circuit 201 including an attenuator circuit 220 according to one embodiment. The capacitance-sensing circuit 201 also includes an integrator 230 and a converter 240. In one embodiment, the converter 240 is a charge-balanced converter as described herein with active integrators. In another embodiment, the converter is an analog-to-digital converter (ADC). Alternatively, other circuits can be used to convert the measured signal into a digital value. The capacitance-sensing circuit 201 may be part of a touchscreen controller coupled to an indium-tin-oxide (ITO) panel 250 (or other sense arrays 125 described above). The touch screen controller measures input current from the ITO panel 250 and based on this data calculates the touch position. The signals received from the ITO panel 250 can be attenuated by the attenuator circuit 220 before being input into the integrator 230. The integrator 230 integrates the attenuated signal and inputs the resulting signal into the converter 240. The converter 240 converts the integrated signal into a digital value. This digital value can be processed further by the capacitance-sensing circuit 201 or by the processing device 110 or the host processor 150. The digital value represents a capacitance measured on the ITO panel 250 for purposes of detecting touches on the ITO panel 250 by one or more conductive objects, as well as positions of the touches, gestures by conductive objects, or the like. The attenuator circuit 220 converts the converter 240 into a charge-balancing converter for input current measurements of the ITO panel 250.

As described above, the high amplitude noise signals can saturate the integrator 230 and put the convert 240 in a non-linear mode without the use of the attenuator circuit 220. The attenuator circuit 220 between the ITO panel 250 and the integrator 230 may decrease the noise amplitude and may keep the integrator 230 from saturating, keeping converter 240 in a linear operation range.

The capacitance-sensing circuit 201 may be a charge-balancing input current to digital data converter with one or more active integrators as illustrated in FIG. 2A. In other embodiment, the capacitance-sensing circuit 201 may include other types of current measuring circuits, such as a current conveyor, which can be used with the attenuator circuits. The capacitance-sensing circuit 201 with the charged-balanced attenuator 220 supports mutual-capacitance sensing mode, self-capacitance sensing mode, or both. The charged-balanced attenuator 220 has small cross-impedance. The cross-impedance is the impedance between the ITO panel 250 and the capacitance-sensing circuit 201. The charged-balanced attenuator 220 can also be used to provide a zero bias current to the integrator 230. The charged-balanced attenuator 220 can keep the ITO panel 250 at a constant potential for mutual-capacitance sensing mode. The charged-balanced attenuator 220 can be realized on discrete components and is compatible with existing touchscreen controllers with active integrators.

It should be noted that in the mutual-capacitance sensing mode, the integrator input has a constant potential. For example, the ITO receive (RX) lines should have the same potential as the integrator input. In the self-capacitance sensing mode, the integrator's input potential goes up and down, but the voltage waveform on the ITO RX sensors should be the same as on the integrator input. The charged-balanced attenuator 220 has as small as possible cross-impedance. The attenuator cross-impedance adds to the total system impedance. If attenuator cross-impedance is high it may increase the ITO panel's charge-discharge time and may limit the maximum operation frequency. It should also be noted that ITO panel 250 may produce small current pulses in micro-amperage (uA) range. The charged-balanced attenuator 220 can be configured to not generate any significant bias current to the integrator 230 so that it does not cause saturation of the integrator 230.

In some embodiments, the charged-balanced attenuator 220 can be easily realized with commonly used discrete components. This may allow pre-silicon validation of the touchscreen controller and decrease system design time. Additional details of variations of the charged-balanced attenuator 220 are described below with respect to FIGS. 2B-11.

Figure 2B:
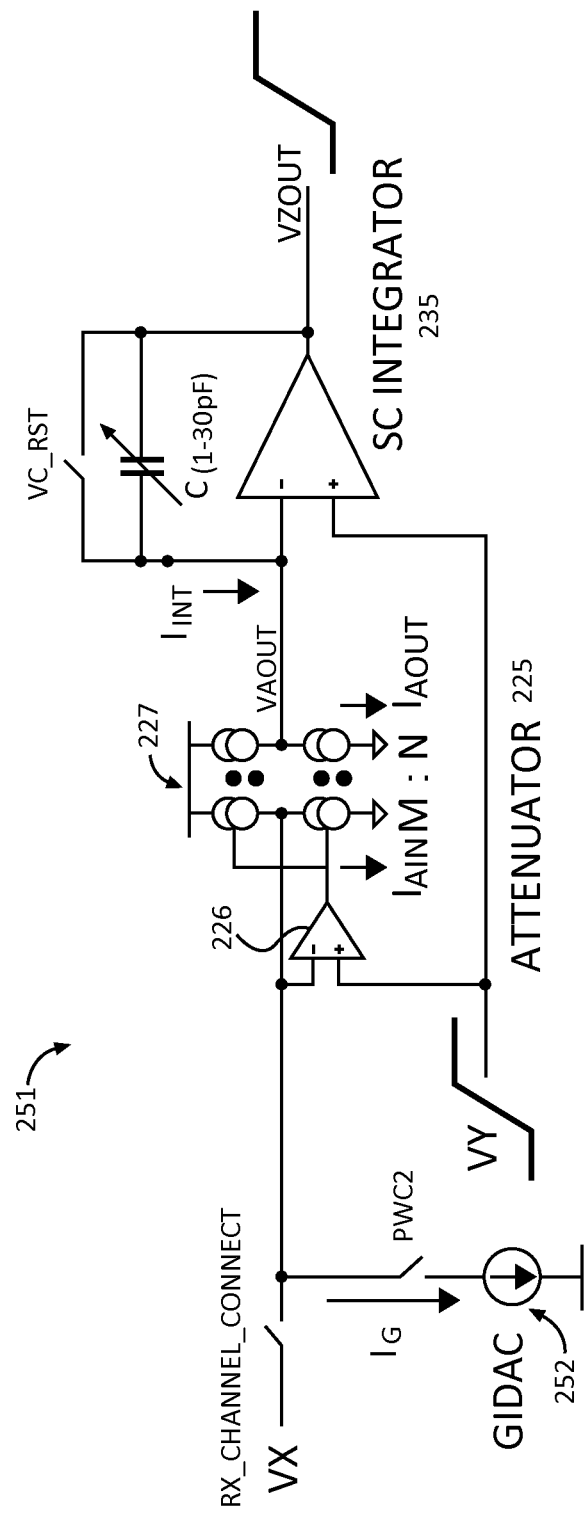
FIG. 2B is a circuit diagram of the capacitance-sensing circuit including a current mirror based solid-state attenuator according to one embodiment.

FIG. 2B is a circuit diagram of the capacitance-sensing circuit 251 including a current mirror based solid-state attenuator according to one embodiment. The capacitance-sensing circuit 251 includes a programmable current source 252 that can be switched in and out of an input from the RX line from the ITO panel (not illustrated). The input from the RX line is input into the attenuator circuit 225. The attenuator circuit 225 includes an operational amplifier 226, and a current mirror circuit 227. The input current $I_{AIN}$ is input into the current mirror 227 and the current mirror 227 outputs the output current $I_{AOUT}$. The current mirror 227 can attenuate the input signal by a ratio M:N of input signal to output signal. The current mirror 227 outputs the output signal into the integrator 235 that integrates the signal and outputs the signal to a converter (not illustrated) to be converted to a digital value. When the attenuator circuit 225 is enabled, the panel charge-discharge currents are formed by the combination of the internal attenuator current sink/sources of the current mirror 227 and by programmable current source 252. The programmable current source 252 serves a role of a hardware baseline compensation circuit. The attenuator 225 is based on matched metal-oxide-semiconductor (MOS) transistors. Its implementation may not suitable directly for the discrete components prototyping due to absence of the well matched Low power P/N channel MOS transistors in the discrete form. In the self-capacitance sensing mode, the attenuator 225 may have a slower frequency of operation as the calibration current takes from the current required to pull up and pull down the RX line (e.g., labeled VX node). The capacitance-sensing circuit 251 may have output current asymmetry, leakage currents, and limited output current range.

Figure 3A:
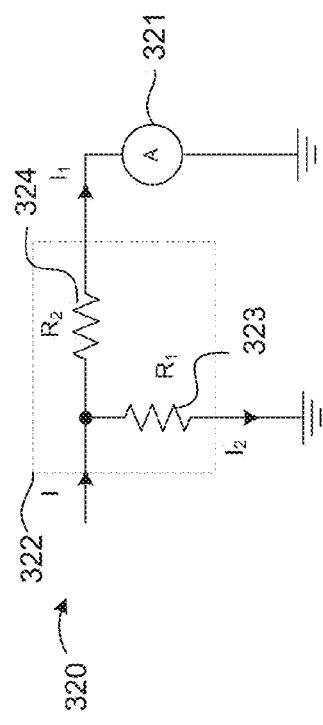
FIG. 3A is a circuit diagram illustrating a basic attenuator circuit according to one embodiment.

FIG. 3A is a circuit diagram illustrating a basic attenuator circuit 320 according to one embodiment. The basic attenuator circuit 320 includes a current measurer 321 and an attenuation matrix comprising two resistors 323, 324. The attenuator circuit 320 receives a current I at an input node coupled to the attenuation matrix 322. The attenuation matrix 322 operates to split the current I into two currents, $I_1$ and $I_2$. The following equations (1) (2) characterize the relationship between the relationships between the currents and the resistors of the attenuation circuit 320.

$$I = I_1 + I_2, \text{ and} \quad (1)$$

$$\frac{R_2}{R_1} = \frac{I_1}{I_2}. \quad (2)$$

The attenuator circuit 320 illustrates the concept, but may not work in self-capacitance sensing mode because it cannot keep the ITO panel at a constant potential. The attenuator circuit 320 may not be compatible with existing touchscreen controllers. The following attenuator circuits can be used in self-capacitance sensing modes and mutual-capacitance sensing modes and can keep the ITO panel at a constant potential. Also, the following attenuator circuits can be compatible with existing touchscreen controllers.

Figure 3B:
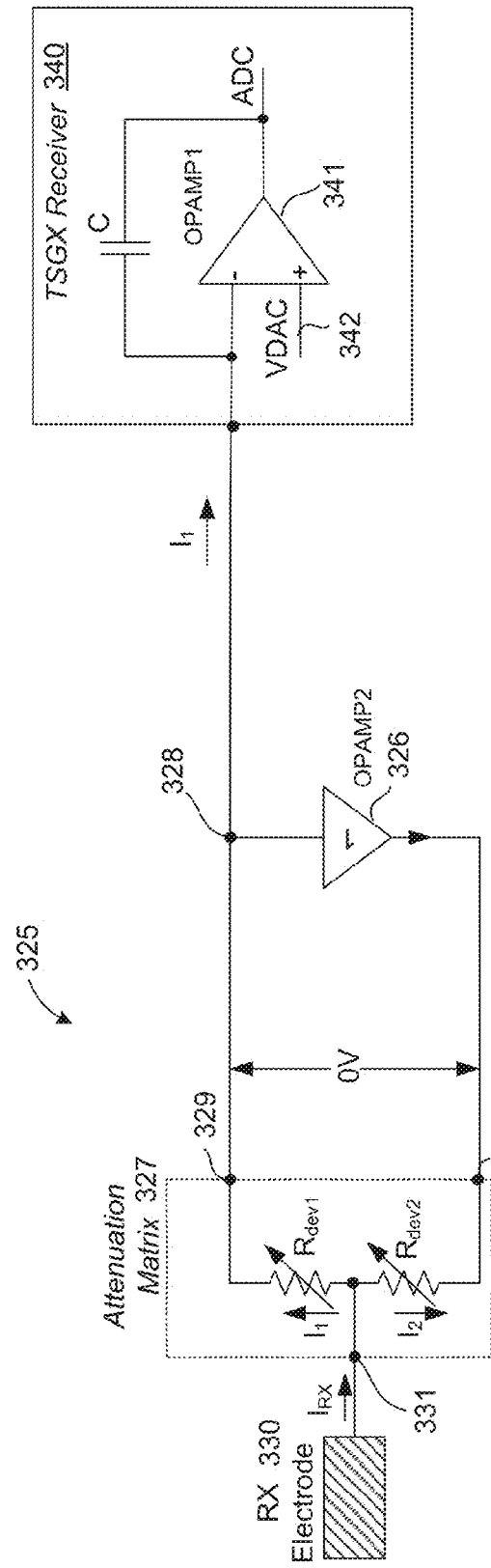
FIG. 3B is a circuit diagram illustrating an attenuator circuit according to another embodiment.

FIG. 3B is a circuit diagram illustrating an attenuator circuit 325 according to another embodiment. The attenuator circuit 325 includes a buffer 326 and an attenuation matrix 327. The attenuation matrix 327 includes an input terminal 331 that is coupled to an electrode 330 of a sense array (e.g., RX line of ITO panel). The attenuation matrix 327 includes two output terminals 329, 332 and the buffer 326 is coupled between the two output terminals. An input of the buffer 326 is coupled to an input node 328 that is input into a receiver 340, which includes an active integrator. The output terminal 329 is coupled to the input node 328 and the output terminal 332 is coupled to an output of the buffer 326. The buffer 326 is configured to keep the two terminals 329, 332 at the same potential as the input of the receiver 340 (i.e., same potential as the integrator input).

In one embodiment, the buffer 326 is a unity gain amplifier that keeps voltage on $R_{dev2}$ bottom pin (output terminal 332) the same as the receiver input. The attenuation matrix 327 can be used to split the current from the RX electrode 330. In particular, the current $I_{RX}$ from the electrode 330 splits into two currents $I_1$ and $I_2$. The current $I_{RX}$ from RX electrode $I_{RX}$ splits on two currents $I_1$ and $I_2$ by the attenuation matrix 327 as expressed by the following equation (3).

$$I_{RX} = I_1 + I_2 \quad (3)$$

The first current $I_1$ goes to receiver input via the output terminal 329. The second current $I_2$ goes from the output terminal 332 to ground via the operation amplifier output of the buffer 326. The relation between $I_1$ and $I_2$ depends on relation between the resistors of the attenuation matrix 327. The attenuation matrix 327 includes two resistors $R_{dev1}$ and $R_{dev2}$, and the relationships of the two currents and the two resistors are represented in the following equation (4).

$$\frac{I_1}{I_2} = \frac{R_{dev2}}{R_{dev1}} \quad (4)$$

The current dividing ratio depends on the relationships between resistors $R_{dev1}$ and $R_{dev2}$. The resistors $R_{dev1}$ and $R_{dev2}$ can be programmable at manufacturing or can be configured at run time. The resistors $R_{dev1}$ and $R_{dev2}$ may be variable resistors or a network of switchable resistors can be used to change the attenuation ratio of the attenuation matrix 327. In another embodiment, the attenuator matrix 327 can be implemented using MOSFET transistors instead of a resistive divider. The MOSFET transistors can have different conductivity depending on gate voltages. In another embodiment, the attenuator matrix 327 can be implemented using current mirrors instead of resistive divider. The current mirror transfers current from input to output with some coefficient. The attenuation matrix 327 and buffer 326 operate to keep the input terminal 331 and output terminals 329, 332 at the same voltage potential. The attenuator circuit 325 may work best with a low-input impedance receiver. In this embodiment, the receiver 340 is configured to operate in a mutual-capacitance sensing mode. The receiver 340 can be configured to operate in a self-capacitance sensing mode as illustrated and described with respect to FIG. 4A. In the mutual-capacitance sensing mode of FIG. 3B, the receiver 340 uses a voltage reference 342, such as from a programmable voltage source (VDAC), for an positive input terminal of an operational amplifier 341.

Figure 4A:
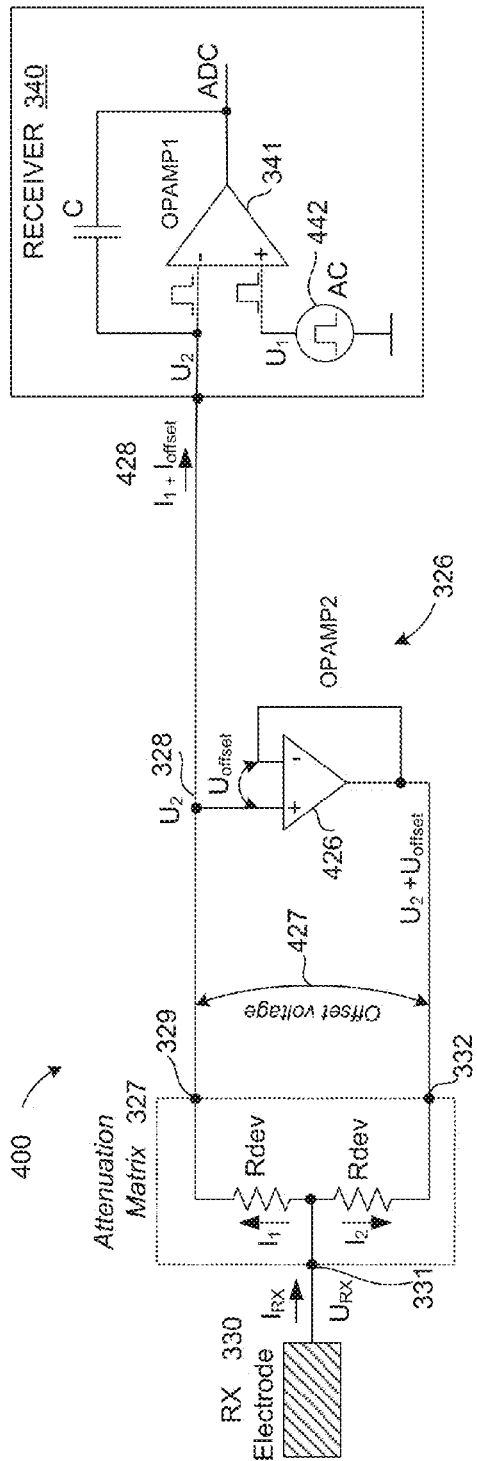
FIG. 4A is a circuit diagram illustrating an attenuator circuit in a self-capacitance measurement mode according to another embodiment.
Figure 4B:
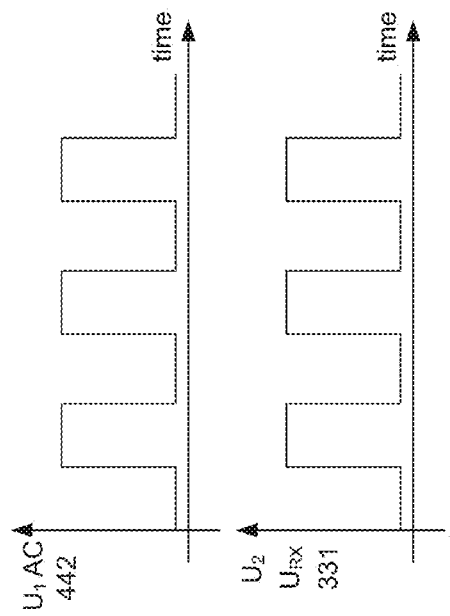
FIG. 4B is a diagram illustrating signal waveforms of the attenuator circuit of FIG. 4A according to one embodiment.

FIG. 4A is a circuit diagram illustrating an attenuator circuit 400 in a self-capacitance measurement mode according to another embodiment. The attenuator circuit 400 is similar to the attenuator circuit 325 as noted by similar reference numbers. The receiver 340 in self-capacitance sensing mode has an alternating current (AC) reference voltage source as a reference voltage of the operational amplifier 341, instead of the programmable voltage reference (VDAC) as in FIG. 3B. The AC reference voltage reference $U_1$ 442 is input from the AC reference voltage source to a positive input terminal that reflects on a negative input terminal ($U_2$) of the operational amplifier 442. The buffer 326 includes an operational amplifier 426 that provides the same voltage potential as $U_2$ on both terminals of the attenuation matrix 327. As a result, the voltage potential at the input terminal 331 ($U_{RX}$) has the same voltage waveform as the AC reference voltage at the positive input terminal of the operational amplifier 341, as illustrated in FIG. 4B.

In a further embodiment, when the receiver 340 is configured for operation in mutual-capacitance sensing mode, the attenuator circuit 400 keeps RX 330 sensor current $I_{RX}$ big enough for full panel capacitance charge, and reduces the current $I_{RX}$ to the first current $I_1$ for being input into the receiver 340.

Ideally, the buffer 326 has zero input offset voltage across the two output terminals 329, 332 as illustrated in FIG. 3B. The buffer 326 may have a relatively small input offset voltage 427 that affects operation of the receiver 340 when in a self-capacitance measurement mode as illustrated with respect to FIG. 4A. The offset current can be represented in the following equation (5).

$$I_{offset} = \frac{U_{offset}}{R_{dev1} + R_{dev2}} \quad (5)$$

In one embodiment, the input offset voltage 427 can be compensated by the receiver 340. For example, a programmable current source (IDAC) of the receiver 340 can be used to compensate for the input offset voltage 427. For example, a 0.5 mV across two 200 Ohm resistors in the attenuation matrix 327 creates 1.25 uA current. This current can be compensated by a local IDAC of the receiver 340. Some receivers can compensate current up to a maximum current of about 6 uA. Some operational amplifiers that can be used for the buffer 326 can have an input offset voltage of about 70 uV that causes much smaller offset currents in the input of the receiver 340.

It should be noted that the offset voltage value may limit the minimum divider resistors value. The same offset voltage across smaller resistors causes higher currents that need to be compensated. The output slew rate parameter may be important for operation in self-capacitance sensing mode. The slow slew rate may cause some short voltage spikes across the divider, similar to static offset voltage. These spikes happened during voltage switching of the RX sensor 330. If these spikes are high enough in amplitude, the spikes can saturate the RX channel. In other embodiments, the input offset voltage 427 may be reduced or eliminated if the amplifiers of the integrator and buffer have the same offset voltage, as illustrated and described with respect to FIG. 5.

Figure 5:
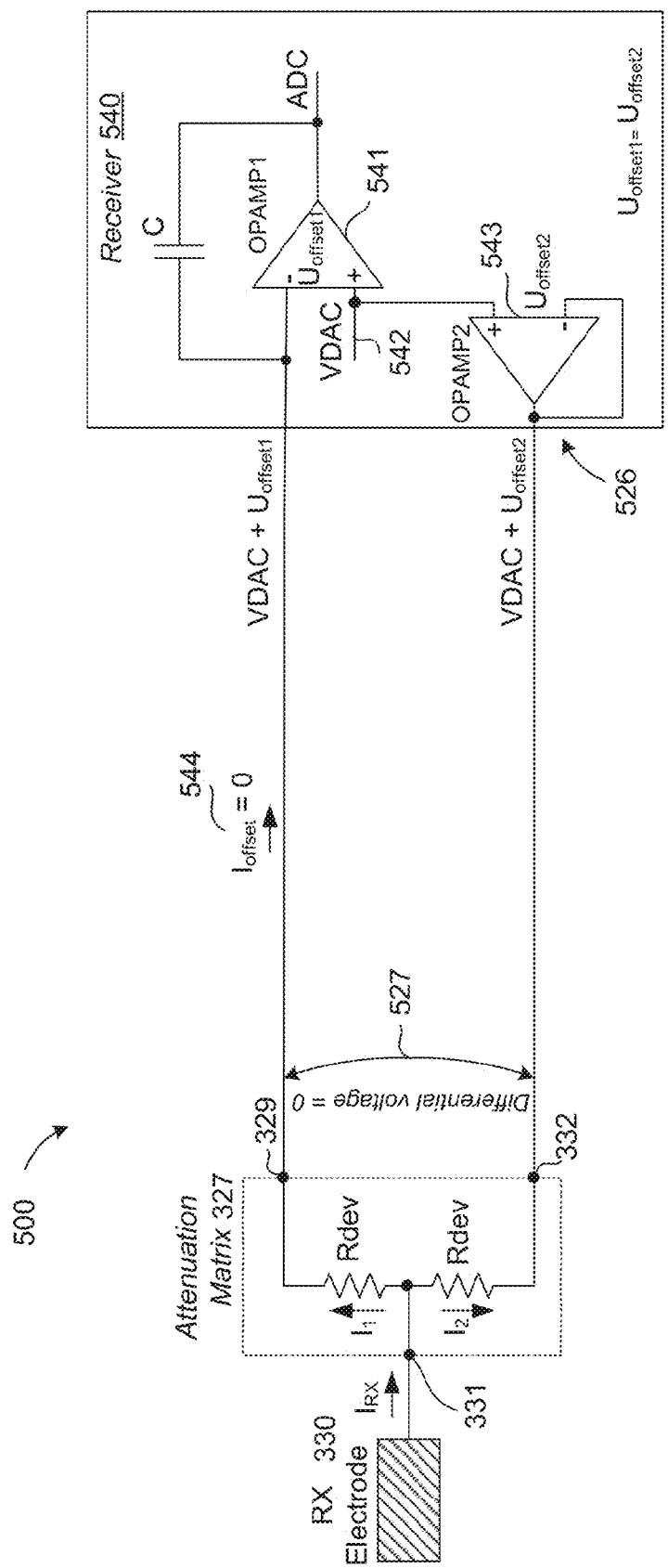
FIG. 5 is a circuit diagram illustrating an attenuator circuit without input offset voltage according to another embodiment.

FIG. 5 is a circuit diagram illustrating an attenuator circuit 500 without input offset voltage according to another embodiment. The attenuator circuit 500 includes the attenuation matrix 327 and a buffer 526. The buffer 526 may be integrated into the receiver 540. The receiver 540 includes a first operational amplifier 541 with a programmable voltage reference 542 and a second operational amplifier 543 with the same programmable voltage reference 542. The output terminal 329 is coupled to the input of the receiver at the negative input terminal of the first operational amplifier 541. The output terminal 332 is coupled to an output of the second operational amplifier 543. The first operational amplifier 541 and the second operational amplifier 543 have the same offset voltage (e.g., $U_{offset1} = U_{offset2}$). The negative terminal voltage of the first operational amplifier 541 is the programmable reference voltage 542 plus the first offset voltage $U_{offset1}$. The negative terminal voltage of the second operational amplifier 543 is the programmable reference voltage 542 plus the second offset voltage $U_{offset2}$. The first operational amplifier 541 and the second operational amplifier 543 may be matched amplifiers to have the same offset voltage. A differential voltage 527 across the two output terminals 329, 332 of the attenuation matrix 327 is zero. When the sensor current $I_{RX}$ is zero, the integrator input current 544 is also zero (e.g., $I_{offset}=0$). As a result, the receiver 540 has zero bias current when the two operational amplifiers are matched. The attenuator circuit 500 can be used to provide zero differential voltage across the attenuator matrix 327 as shown in FIG. 3B and FIG. 5. The receiver 540 can operate in a mutual-capacitance sensing mode and a self-capacitance sensing mode.

The attenuator circuit 500 can be implemented in the same integrated circuit as the receiver 540. Alternatively, the attenuator circuit 500 can be implemented as an external circuit to an integrated circuit of the receiver 540. An external attenuator circuit may be useful in pre-silicon validation. For example, the usage of the attenuator circuit usage may allow testing of a touchscreen controller chip under real noise conditions. The attenuator circuit 500 is configured to keep the integrator of the receiver 540 (and the corresponding converter such as an analog-to-digital converter (ADC)) in a liner operation region, even under the high amplitude noise. In this case of no integrator saturation, the noise can be effectively filtered by a median filter, a window filter, an IIR filter, or any combination thereof. Also, the frequency hopping may be effective if the converter is not in the saturation mode.

The raw data under different noise voltages without the attenuator circuits described herein may cause the raw data to shift. For example, 10V noise shifts raw data significantly and changes the noise distribution shape. The charge-balanced attenuators described herein can be used to keep the raw data values in the same region under different noise voltages. The noise distribution waveform has close to a Gaussian shape so that it can be effectively filtered.

Figure 6:
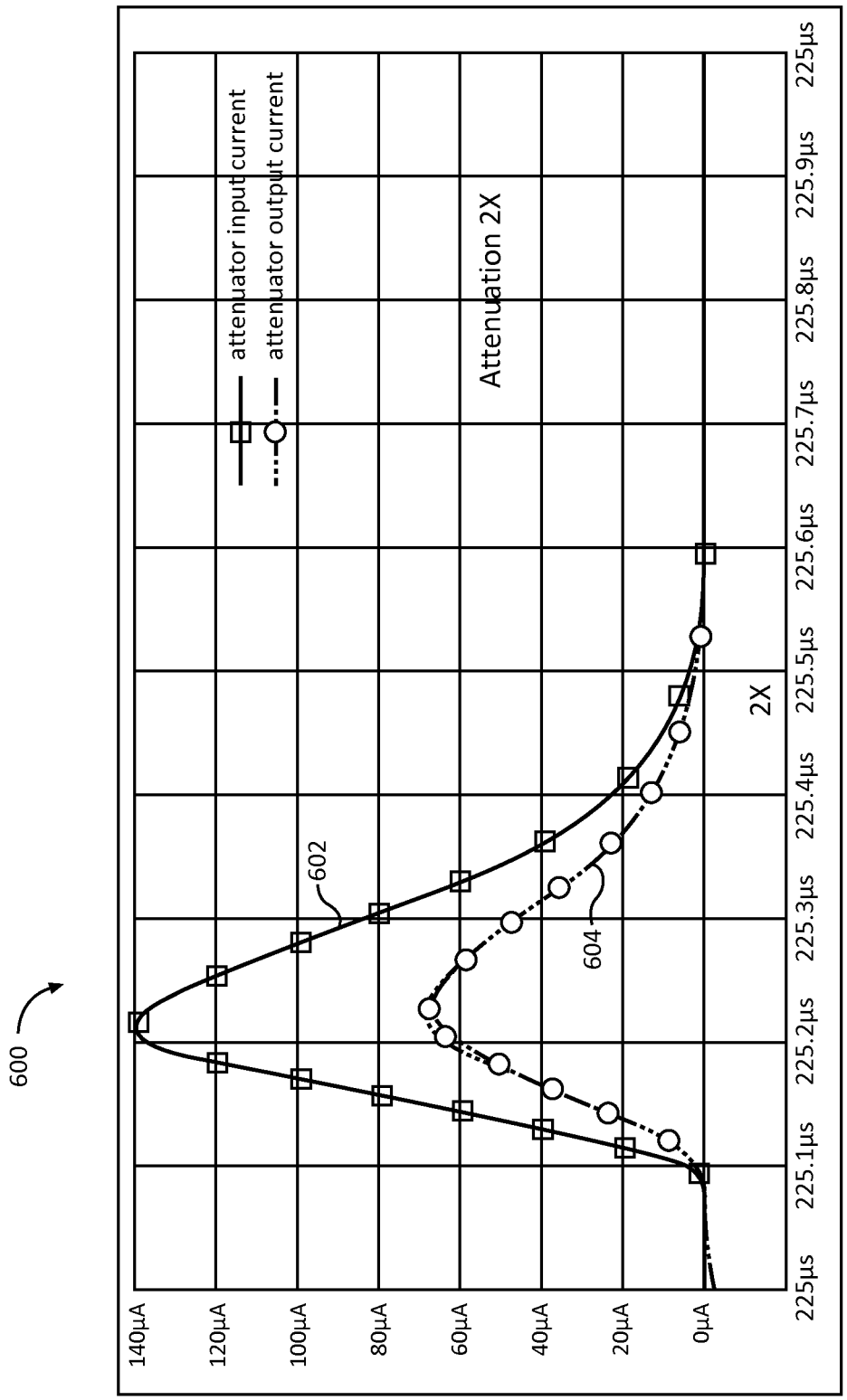
FIG. 6 is a diagram illustrating an input current and an output current of an attenuator circuit according to one embodiment.

FIG. 6 is a diagram 600 illustrating an input current 602 and an output current 604 of an attenuator circuit according to one embodiment. The diagram illustrates the attenuator circuit operation for the one half-TX period time. The attenuator circuit has an attenuation ratio of 2X in this example. The input current 602 and the output current 604 illustrates that the attenuator circuit works as expected. The square marked line is the input current 602 from RX electrode. The circle marked line is output current 604 that is input into the integrator.

Figure 7:
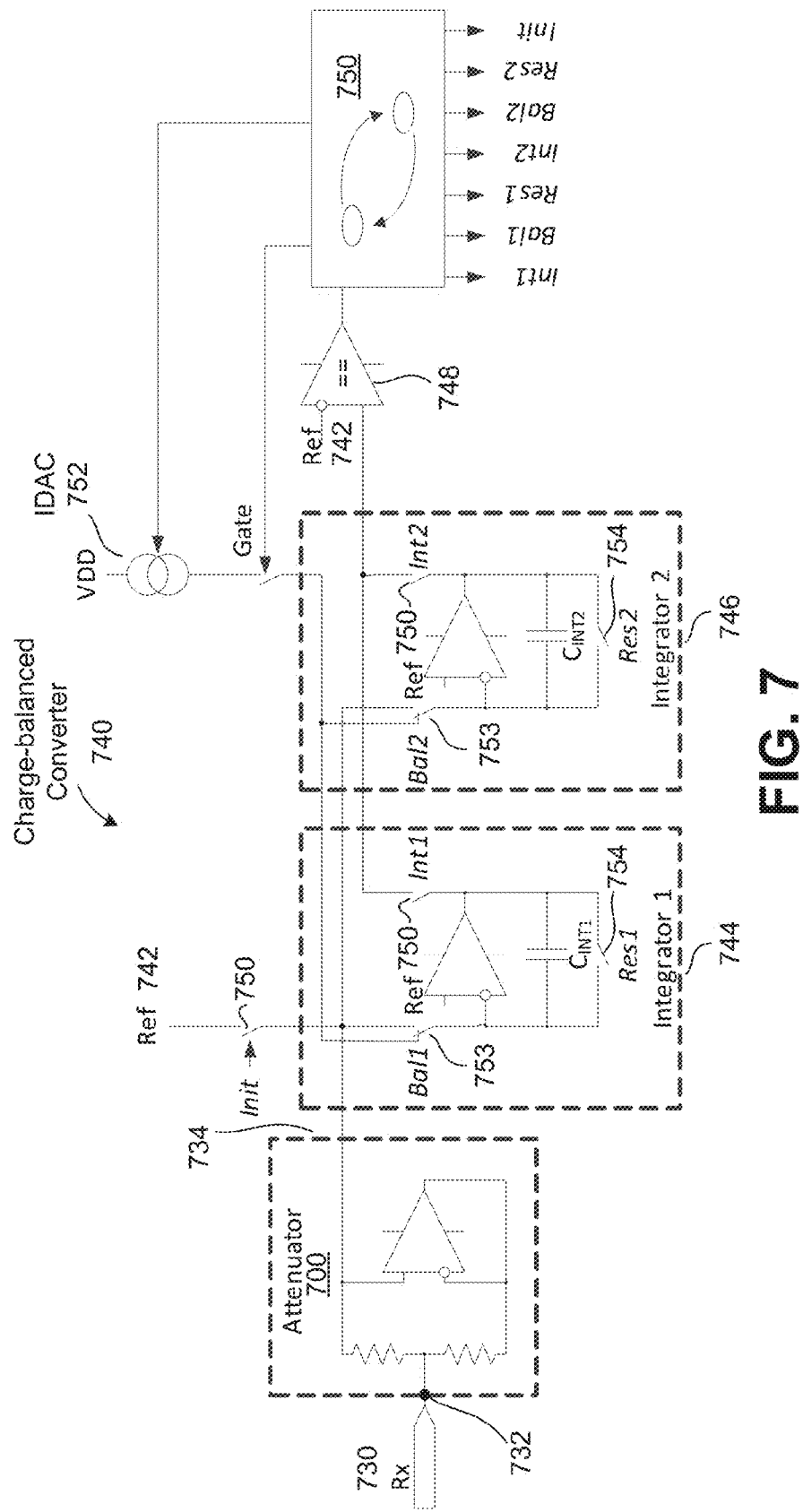
FIG. 7 is a circuit diagram illustrating an attenuator circuit with a charge-balanced converter two integrators with a single programmable current source according to one embodiment.

FIG. 7 is a circuit diagram illustrating an attenuator circuit 700 with a charge-balanced converter 740 according to one embodiment. The charge-balanced converter 740 includes a first integrator 744 and a second integrator 746, a comparator 748, a digital sequencer 750 and a single programmable current source (IDAC) 752. The attenuator circuit 700 is similar to the attenuator circuit 325 of FIG. 3B and attenuator circuit 400 of FIG. 4A. The attenuator 700 receives a current signal 732 from the RX sensor 730 and attenuators the current signal to an attenuated signal 734 to be input to the first integrator 744 or the second integrator 746. The attenuator circuit 700 attenuates the current signal 732 by an attenuation ratio as set by an attenuation matrix. The digital sequencer 750 controls control signals to control initialization switches 750, balancing switches 753 and reset switches 754. The digital sequencer 750 also controls a gate switch of the programmable current source, IDAC 752. The digital sequencer 750 can also program the value of the IDAC 752. To balance the current, the digital sequencer 750 uses the IDAC 752 to control the balancing switches 753. For example, the digital sequencer 750 activates the first balance switch 753 so the attenuated signal 734, which represents the panel current, to flow to the first integrator 744 and provides balancing for the charge accumulated previously by the second integrator 746 at the same time. At the next cycle, the first integrator 744 and the second integrator 746 are swapped and the attenuated panel circuit 734 flows to the second integrator 746 via the second balance switch 753 and balancing is provided for previously accumulated charge by the first integrator 744.

Figure 8:
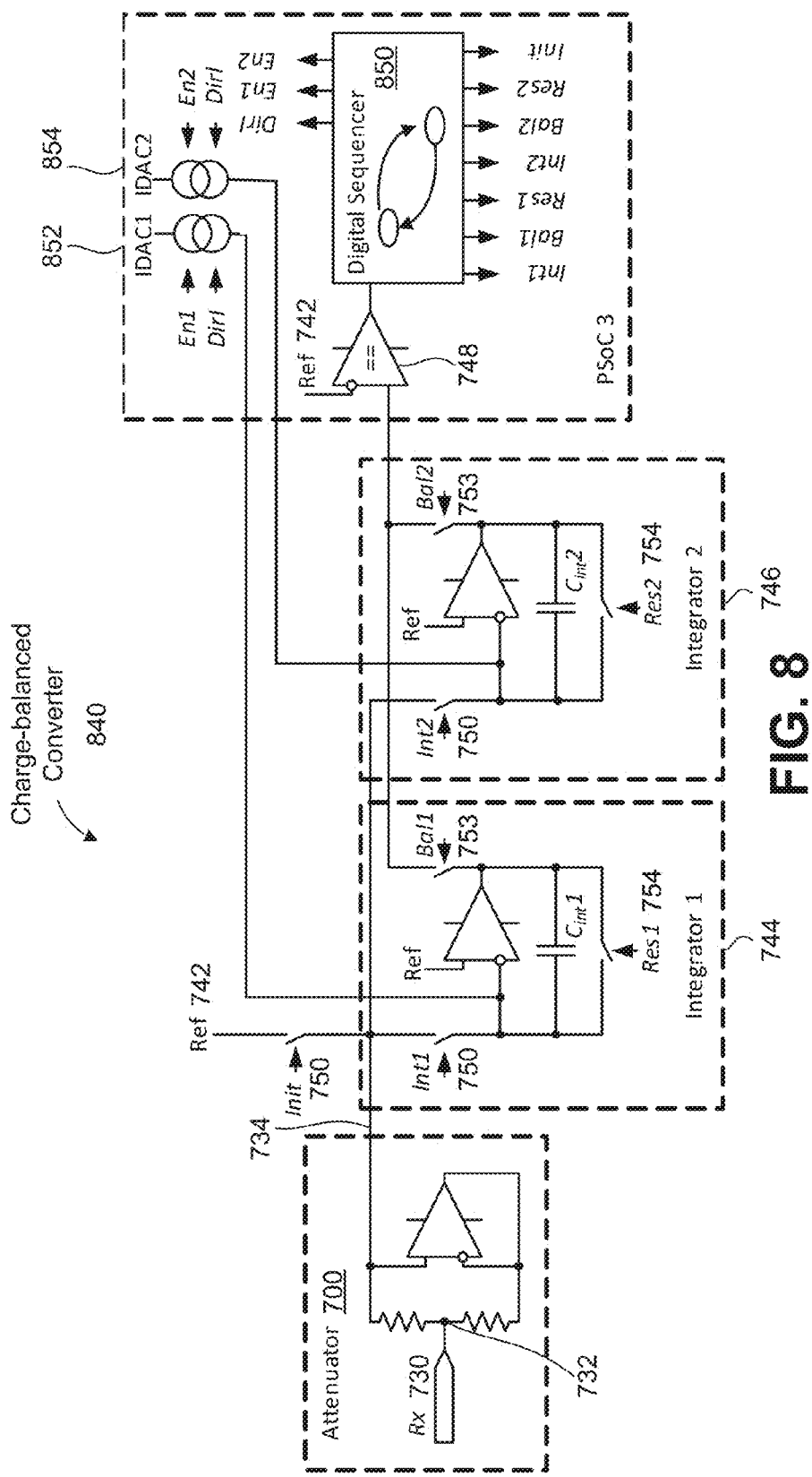
FIG. 8 is a circuit diagram illustrating an attenuator circuit with a charge-balanced converter according to another embodiment.

FIG. 8 is a circuit diagram illustrating an attenuator circuit 700 with a charge-balanced converter 840 according to another embodiment. The charge-balanced converter 840 is similar to the charge-balanced converter 740 of FIG. 7 as noted by similar reference numbers. The charge-balanced converter 840 has two programmable current sources, IDAC1 852 and IDAC2 854 and a digital sequencer 850 to independently control the programmable current sources 852, 854. The two IDACS 852, 854 can be used to individually compensate each signal half-wave even if they have different magnitudes. The attenuator circuit 700 works the same as those described above. The digital sequencer 850 can independently enable the IDACs 852, 854, via enable signals (En1, En2). The directions of the IDACs 852, 854 can be controlled by direction signals (Dir1, Dir2). In this embodiment, the balance switches 753 are on the outputs of the operational amplifiers of the integrators 744, 746 and the initialization switches 750 are on the inputs of the operational amplifiers of the integrators 744, 746.

Figure 9:
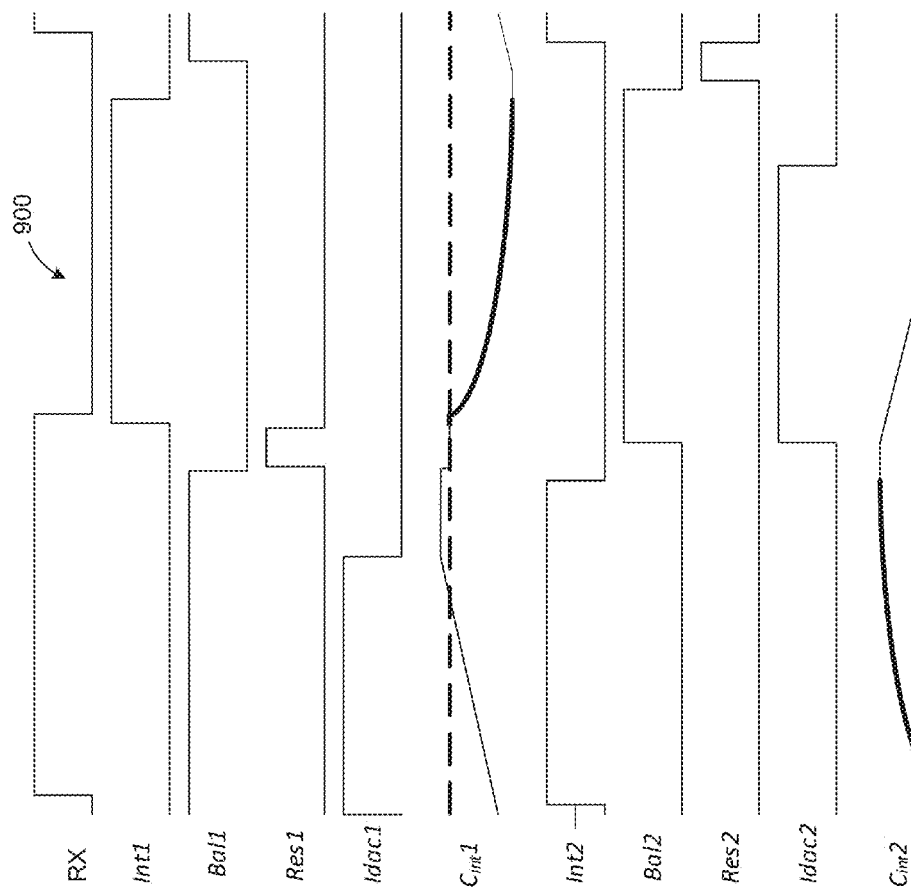
FIG. 9 is a diagram illustrating signal waveforms of the attenuator circuit of FIG. 8 according to one embodiment.

FIG. 9 is a diagram 900 illustrating signal waveforms of the attenuator circuit of FIG. 8 according to one embodiment. The diagram 800 illustrates two cycles. During the first cycle, the first Integrator 1 balances charge and the second Integrator 2 accumulates charge that comes from the attenuator circuit 700. During the second cycle, the first Integrator 1 accumulates charge from attenuator circuit 700 and the second integrator 2 balances charge. During the charge balancing, the IDAC current increases or decreases Cint voltage up to a triggering point of the comparator 748. The IDAC current direction depends on the Dirlx signal. Before switching from balancing cycle to integration cycle the integrator is reset by ResX signal. The first integrator Int1 accumulates negative current from attenuator and its voltage goes down. The second integrator 2 accumulates positive current from the attenuator circuit 700 and its output goes up.

Embodiments of the attenuator circuits described above include operational amplifiers. In other embodiments, other types of circuits may be as part of the attenuator circuits, such as current conveyors as described and illustrated with respect to FIGS. 10, 11A and 11B.

Figure 10:
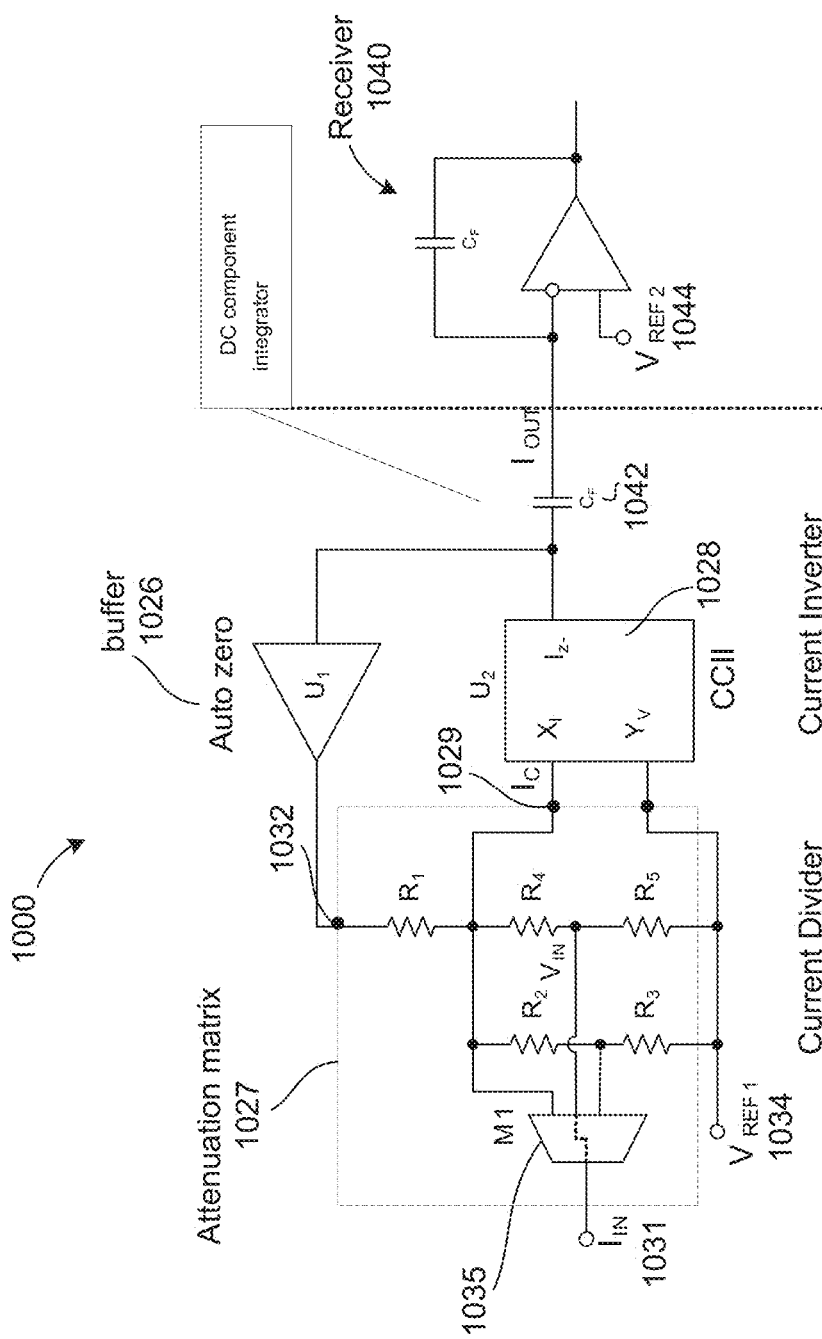
FIG. 10 is a circuit diagram illustrating an attenuator circuit with current conveyor based capacitance-sensing circuit according to one embodiment.

FIG. 10 is a circuit diagram illustrating an attenuator circuit 1000 with current conveyor based capacitance-sensing circuit according to one embodiment. The attenuator circuit 1000 includes a buffer 1026 and an attenuation matrix 1027 and a current conveyor 1028. The attenuation matrix 1027 includes an input terminal 1031 coupled to an electrode of a sense array (RX sensor) and an input terminal 1034 coupled to a first voltage reference ($V_{REF1}$). An output terminal 1029 is coupled to an input of the current conveyor 1028. Another input of the current conveyor 1028 is coupled to the first voltage reference ($V_{REF1}$). The buffer 1026 (Auto zero U1), such a unity gain amplifier, is coupled to an output of the current conveyor and another terminal 1032 of the attenuation matrix 1027. The attenuation matrix 1032 includes a multiplexer 1035 coupled to the input terminal 1031 to select different nodes in the attenuation matrix 1027. The attenuation matrix includes multiple resistive dividers between the different nodes and the voltage reference and the terminal 1032. The output of the current conveyor 1028 is coupled to a capacitor (CF) 1042 and the capacitor 1042 is coupled to an input of a receiver 1040. The capacitor 1042 operates as a DC component integrator before the receiver 1040. The receiver 1040 includes an active integrator. The active integrator uses a second voltage reference 1044. The CF capacitor 1042 with smaller value has a higher impedance. The higher capacitor impedance requires a higher voltage across capacitor to transfer same current. In the attenuator circuit 1000, the current conveyor output voltage can be stabilized in a wide frequency range. This stabilization is a result of negative feedback net trough a single resistor ($R_1$). The negative feedback by itself decreases gain. For example, the CCII has own DC gain 1 without negative feedback and DC gain 0.5 with 50% negative feedback. If negative feedback operates in wide frequency range that includes touchscreen controller operation frequency that negative feedback influence on these signals is the same as on direct current. The negative feedback keeps the current conveyor output voltage stable. The negative feedback reduces amplification on TX frequency on the input terminal 1031, and as the result, the receiver input current. In other words, the attenuator circuit 1000 with attenuation ratio 1X has an actual attenuation of 3.5X because of 25% negative feedback. The CCII own gain is 1X and negative feedback adds attenuation about 3.5X. The actual attenuation ratio depends on negative feedback value or depth.

FIG. 11A is a circuit diagram illustrating a feedback of the current conveyor of FIG. 10 according to one embodiment. The circuit diagram is a simplified schematic of the feedback of the current conveyor 1028 of FIG. 10. In this embodiment, the feedback includes a single resistor 1032. FIG. 11B is a circuit diagram illustrating a modified feedback 1132 of the current conveyor 1028 of FIG. 10 according to another embodiment. The modified feedback 1132 includes a low pass filter including two resistors in series and a capacitor coupled between a node between the two resistors and ground. The negative feedback compensates for the DC component or low frequency voltage changes on the current conveyor output. The low frequency drifts can be caused by temperature changes, humidity changes, power supply voltage changes or components aging. The high frequency AC voltage pulses caused by TX current are rejected from feedback signal by the low pass filter illustrated in FIG. 11B. The idea is to have a negative feedback at low frequencies for operation point stabilization and to not have negative feedback at high frequencies. The TX voltage pulses on current conveyor output causes current to RX channel though the capacitor 1042. In one embodiment, the capacitor 1042 in FIG. 11A is approximately 10 nF. In another embodiment, the capacitor 1042 in FIG. 11B is approximately 220 pF. Alternatively, other capacitor values may be used for the capacitor 1042.

It should be noted that the embodiments of the attenuator circuits can be used in other measurement systems than capacitance-sensing circuits such as those described above. In other embodiments, the attenuator circuits can be used to divide current that needs to be measured. These applications may be medical applications, industrial applications, automotive applications or the like. The attenuator circuits, as described herein can be used at the input of measurement devices to prevent saturation and may effectively decrease noise by digital filtration or by some other noise reduction methods.

Figure 12:
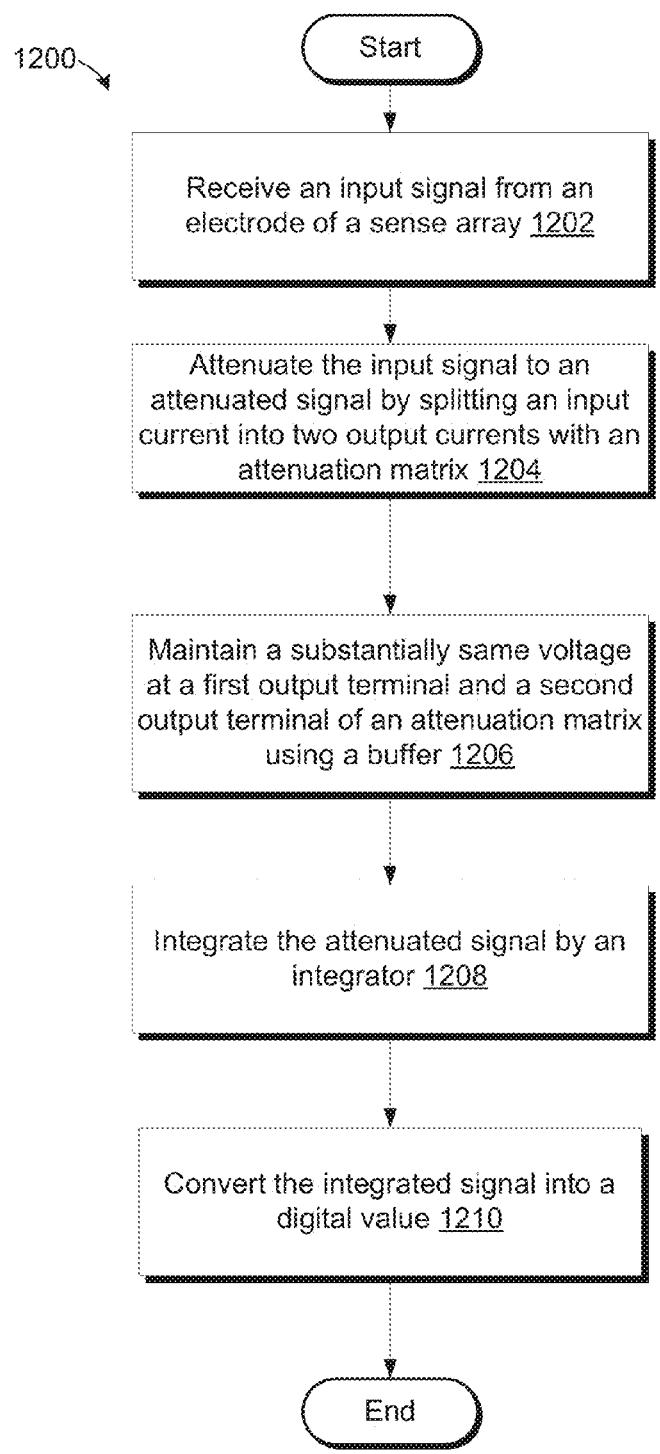
FIG. 12 is a flow diagram of a method of attenuating an input signal from an electrode of a sense array according to an embodiment.

FIG. 12 is a flow diagram of a method 1200 of attenuating an input signal from an electrode of a sense array according to an embodiment. The method 1200 may be performed by processing logic that may comprise hardware (circuitry, dedicated logic, etc.), software (such as is run on a general purpose computing system or a dedicated machine), firmware (embedded software), or any combination thereof. In one embodiment, the processing device 110 performs the method 1200. In another embodiment, the attenuator circuit 120 performs the method 1200. Alternatively, other components of the electronic system 100 perform some or all of the operations of method 1200.

Referring to FIG. 12, the method 1200 begins with processing logic receiving an input signal from an electrode of a sense array (block 1202). The processing logic attenuates the input signal to an attenuated signal by an attenuation circuit comprising an attenuation matrix and a buffer (block 1204). In one embodiment, the processing logic attenuates the signal by splitting an input current of the input signal into a first current on a first output terminal of the attenuation circuit and a second current on a second output terminal of the attenuation circuit. The first current is input into an integrator as the attenuated signal. The processing logic maintains a substantially same voltage at the first output terminal and the second output terminal by the buffer (block 1206). The processing logic integrates the attenuated signal by the integrator into an integrated signal (block 1208). The processing logic converts the integrated signal into a digital value (block 1210).

In a further embodiment, the processing logic converts the integrated signal into a digital value at block 1210 using an ADC coupled to an output of the integrator. In another embodiment, the processing logic converts the integrated signal into a digital value at block 1210 using a comparator coupled to an output of the integrator. The processing logic may perform other operations as described above with respect to FIGS. 1-11.

The methods described above regarding input signal attenuation can be implemented by the attenuator circuit 120, which may be implemented in a capacitive touch screen controller. In one embodiment, the capacitive touch screen controller is the TrueTouch® capacitive touchscreen controllers, such as the CY8CTMA3xx family of TrueTouch® Multi-Touch All-Points touchscreen controllers, developed by Cypress Semiconductor Corporation of San Jose, Calif. The TrueTouch® capacitive touchscreen controllers sensing technology to resolve touch locations of multiple fingers and a stylus on the touch-screens, supports leading operating systems, and is optimized for low-power multi-touch gesture and all-point touchscreen functionality. Alternatively, the touch position calculation features may be implemented in other touchscreen controllers, or other touch controllers of touch-sensing devices. In one embodiment, the touch position calculation features may be implemented with other touch filtering algorithms as would be appreciated by one of ordinary skill in the art having the benefit of this disclosure.

The embodiments described herein may be used in various designs of mutual-capacitance sensing arrays of the capacitance sensing system, or in self-capacitance sensing arrays. In one embodiment, the capacitance sensing system detects multiple sense elements that are activated in the array, and can analyze a signal pattern on the neighboring sense elements to separate noise from actual signal. The embodiments described herein are not tied to a particular capacitive sensing solution and can be used as well with other sensing solutions, including optical sensing solutions, as would be appreciated by one of ordinary skill in the art having the benefit of this disclosure.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A sensing circuit comprising:
    an attenuator circuit to receive a signal from an electrode of a sense array, wherein the attenuator circuit is configured to attenuate input current of the signal to provide an attenuated signal; and
    an integrator to receive the attenuated signal and to output an integrated signal, wherein the attenuator circuit comprises:
        an attenuation matrix comprising an input terminal to receive the signal and a plurality of resistors, wherein the attenuation matrix is configured to split the input current into an output current of the attenuation signal on a first output terminal and a second output current on a second output terminal, wherein the attenuation matrix is to output the attenuated signal on the first output terminal; and
        a buffer coupled between the attenuation matrix and the integrator, wherein the buffer is configured to maintain a substantially same voltage at the first output terminal and the second output terminal.

2. The sensing circuit of claim 1, further comprising a converter coupled an output of the integrator, wherein the converter is configured to convert the integrated signal to a digital value.

3. The sensing circuit of claim 1, wherein the attenuation matrix comprise a resistive divider comprising a plurality of resistors.

4. The sensing circuit of claim 1, wherein the buffer is a unity gain amplifier coupled between the first output terminal and the second output terminal of the attenuation matrix, wherein the unity gain amplifier is configured to maintain a substantially same voltage potential on the first output terminal coupled to an input terminal of the integrator and the second output terminal, and wherein an input of the unity gain amplifier is coupled to the first output terminal and an output of the unity gain amplifier is coupled to the second output terminal.

5. The sensing circuit of claim 1, wherein the integrator comprises a first operational amplifier comprising:
    a first output to be coupled to a converter;
    a first input coupled to the first output terminal of the attenuation matrix; and
    a second input coupled to a voltage reference, and wherein the buffer comprises a second operational amplifier comprising:
        a second output coupled to the second output terminal of the attenuator circuit;
        a third input coupled to the second output that is coupled to the second output terminal; and
        a fourth input coupled to the voltage reference.

6. The sensing circuit of claim 5, wherein the first operational amplifier comprises a substantially same offset voltage as the second operational amplifier.

7. The sensing circuit of claim 5, wherein the first operational amplifier and the second operational amplifier are matched operational amplifiers.

8. The sensing circuit of claim 7, wherein the first operational amplifier and the second operational amplifier reside on a same integrated circuit.

9. The sensing circuit of claim 1, wherein the attenuator circuit and integrator are configured to measure a first capacitance in a mutual-capacitance mode and to measure a second capacitance in a self-capacitance mode.

10. The sensing circuit of claim 1, wherein the integrator comprises a first operational amplifier, wherein an inverting input of the first operational amplifier is coupled to the first output terminal of the attenuation matrix, and wherein a non-inverting input of the first operational amplifier is coupled to an alternating current (AC) voltage source in the self-capacitance mode.

11. The sensing circuit of claim 10, wherein the non-inverting input of the first operational amplifier is coupled to a reference voltage in the mutual-capacitance mode.

12. The sensing circuit of claim 10, wherein the buffer comprises a second operational amplifier configured to provide a substantially same voltage on the first output terminal and the second output terminal of the attenuation matrix that results in a first voltage waveform at the input terminal that is substantially similar to a second voltage waveform of the AC voltage source at the non-inverting input of the first operational amplifier.

13. The sensing circuit of claim 1, wherein the attenuator circuit comprises a current conveyor coupled between the attenuation matrix and an integrator, and wherein the buffer is configured to operate as negative feedback to the current conveyor.

14. The sensing circuit of claim 13, further comprising a resistor coupled between the attenuation matrix and an output of the buffer.

15. The sensing circuit of claim 13, further comprising a low pass filter coupled between the attenuation matrix and an output of the buffer.

* * * * *